United States Patent
Wilson

Patent Number: 6,151,331
Date of Patent: Nov. 21, 2000

[54] SYSTEM AND METHOD FOR PROVIDING A PROXY FARP FOR LEGACY STORAGE DEVICES

[75] Inventor: Stephen K. Wilson, Austin, Tex.

[73] Assignee: Crossroads Systems, Inc., Austin, Tex.

[21] Appl. No.: 09/159,163

[22] Filed: Sep. 23, 1998

[51] Int. Cl.$^7$ ........................................... H04J 3/16
[52] U.S. Cl. .................... 370/465; 370/404; 370/452; 395/200.6
[58] Field of Search .................... 370/216, 351, 370/401, 402, 404, 466, 467, 465, 452, 453, 248, 405; 395/200.6, 200.33

[56] References Cited

U.S. PATENT DOCUMENTS

| | | | |
|---|---|---|---|
| 5,581,558 | 12/1996 | Horney, II et al. | 370/401 |
| 5,870,589 | 2/1999 | Alexander, Jr. et al. | 370/351 |
| 5,944,798 | 8/1999 | McCarty et al. | 370/216 |

Primary Examiner—Douglas W. Olms
Assistant Examiner—Shick Hom
Attorney, Agent, or Firm—Gray Cary Ware & Freidenrich, LLP

[57] ABSTRACT

In a fiber channel network, a method and system for discovering the location of a storage device that does not support FARP using a FARP broadcast using a storage router as a proxy. The storage device can be connected to the storage router via an arbitrated loop or a local SCSI interface. The storage router can perform a discovery to determine the node names of each storage device connected to it and save the discovered storage device node names to a look-up table. The storage router then sends a FARP request to each storage device on the look-up table. For each storage device that responds, flagging the corresponding node name for that storage device in the look-up table as FARP compatible, and for each storage device that does not respond, flagging the corresponding node name as not being FARP compatible. When a FARP broadcast directed to any of the storage devices is received at the storage router, the router determines if the storage device is FARP compatible by accessing the look-up table and if the storage device is not FARP compatible, sends a reply to the FARP broadcast that contains the physical address of the storage device.

18 Claims, 2 Drawing Sheets

6,151,331

SYSTEM AND METHOD FOR PROVIDING A PROXY FARP FOR LEGACY STORAGE DEVICES

TECHNICAL FIELD OF THE INVENTION

The present invention relates generally to computer systems and methods, and more particularly, to a system and method for discovering a non-FARP compatible fibre channel device using a FARP broadcast over a fibre channel network.

BACKGROUND OF THE INVENTION

Fibre channel is the name of an integrated set of standards being developed by the American National Standards Institute (ANSI). Fibre channel is a hybrid channel and networking data transport medium.

Fibre channel topology can be selected depending on system performance requirements or packaging options. One fibre channel topologies commonly used in storage area networks is an arbitrated loop. In an arbitrated loop fibre channel topologies, storage devices, such as hard disk storage devices and tape devices, can be used to store data that can be retrieved by a software application. In order to save or retrieve data from any particular storage device, the storage device must first be located.

One method for discovering the location of storage devices on fibre channel storage network is to make an address resolution protocol (ARP) or a fibre channel address resolution protocol (FARP) inquiry. However, many of the storage devices currently in use are legacy SCSI devices that do not support ARP or FARP. Whether the SCSI storage devices are locally attached to the storage router through a SCSI bus, or are contained in an arbitrated loop attached to the storage router through an FCP interface, conventional fibre channel methods of using ARP or FARP inquiries to discover the location of compatible storage devices will not be successful because a SCSI legacy device that does not support ARP or FARP cannot respond to this discovery inquiry.

Without some mechanism to discover these legacy SCSI devices in a storage area network, FARP inquiries from a host computer will be ignored by these SCSI storage devices, the host will not get a reply and will respond as if the storage device does not exist on the storage area network.

SUMMARY OF THE INVENTION

The present invention provides a system and method for locating storage devices that are not FARP compatible on a fibre channel network that substantially eliminates or reduces disadvantages and problems associated with previously developed discovery systems and methods.

More specifically, the present invention provides a system for responding to a FARP broadcast over a network intended for a storage device that is not FARP compatible. The method includes receiving the FARP broadcast at a storage router having the storage device requested in the broadcast connected. The storage router determines if the storage device is FARP compatible and if not, the storage router sends a reply to the FARP request that contains the physical address of the storage device. If the storage device is FARP compatible, the storage router does not respond to the FARP broadcast.

The present invention can further include steps prior to the FARP broadcast that can include performing a discovery at the storage router of all the node names of the storage devices connected to the storage router and saving the node names to a look-up table on the storage router. The storage router can then send a FARP request to all storage devices having a node name on the look-up table. If the storage device responds to the storage router's FARP request, the node name for that storage device will be flagged as FARP compatible in the look-up table. If the storage device does not respond, because it is not FARP compatible (for example, if it is a SCSI legacy device), the node name for the storage device will be flagged as not being FARP compatible.

The present invention provides an important technical advantage by allowing the use and discovery of legacy SCSI devices on a storage area network using FARP protocol.

The present invention provides another technical advantage by allowing users to continue to use their existing storage devices (many of which are SCSI) in storage area networks utilizing FARP address discovery.

The present invention provides another technical advantage by determining if there are any storage devices on a storage router's local arbitrated loop that do not support FARP and answering FARP discovery inquiries for those storage devices in the event a FARP address discovery is sent to one of those storage devices.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Fibre channel can support both fibre channel address resolution protocol (FARP) and small computer system interface (SCSI) protocol. Thus, fibre channel storage area networks can have both FARP compatible storage devices and legacy SCSI storage devices that are not FARP compatible. The present invention allows the discovery of storage devices that do not support FARP that are attached over a fibre channel network to a storage router by using the storage router as a proxy to answer FARP requests to those storage devices.

Figure 1:
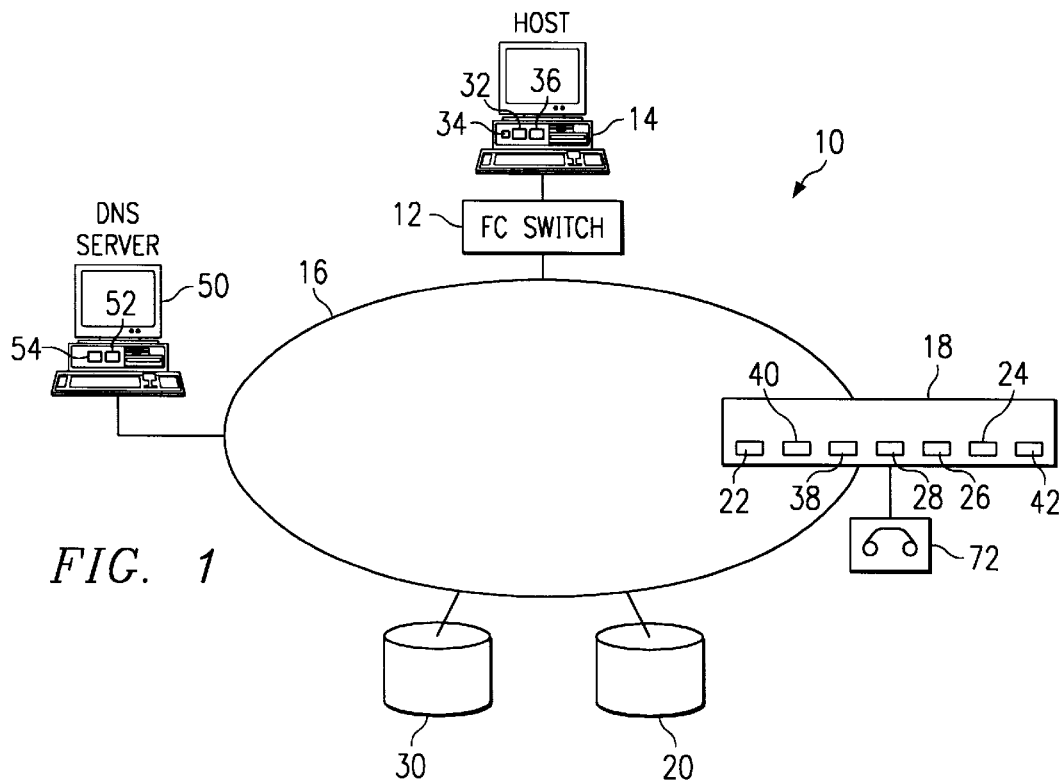
FIG. 1 shows an exemplary storage area network incorporating an embodiment of the present invention.

FIG. 1 shows an exemplary fibre channel storage area network 10 having a host computer 14 connected through a fibre channel switch 12 to an arbitrated loop 16. It should be understood that the present invention is applicable to other fibre channel topologies. The host computer 14 is operable to send FARP broadcasts and is compatible with SCSI devices and can include client software application 34. The arbitrated loop 16 includes a storage router 18 and a FARP compatible storage device 20 and a SCSI storage device 30 that is not FARP compatible. It should be understood that additional arbitrated loops (or other topologies) having additional storage router(s) and additional storage device(s) could be part of the storage area network 10.

It should be further understood that any number of non-FARP compatible storage devices can be supported by the present invention.

Storage router 18 used in conjunction with the present invention must support Fibre Channel Protocol (which is SCSI encapsulated over fibre channel), which can be used by the host computer to discover and communicate with SCSI storage devices attached to the storage router, and Address Resolution Protocol (ARP), which can be used by the host to discover the location, or fibre channel address, of the storage device. Storage router 18 includes a processor and a storage medium or memory. The storage router 18 for use with the present invention also includes a node name discovery software program 24 resident on the storage medium that, when executed, will travel the arbitrated loop 16 and record the node name and arabitrated loop port address AL_PA for storage devices 20 and 30 in a look-up table 22. The storage router 18 also includes a FARP request software program 26 resident on the storage medium that, when executed, will send a FARP request from the storage router 18 to determine which storage devices attached to the storage router 18 are FARP compatible and record that information in the look-up table 22. Storage router 18 also includes a proxy FARP software program 28 resident on the storage medium that, when executed, will act as a proxy and respond to FARP requests for storage devices that are not FARP capable. It should be understood that the node name discovery software program 24, the FARP request software program 26, and the proxy FARP software program 28 could be included in a single software program.

Figure 2:
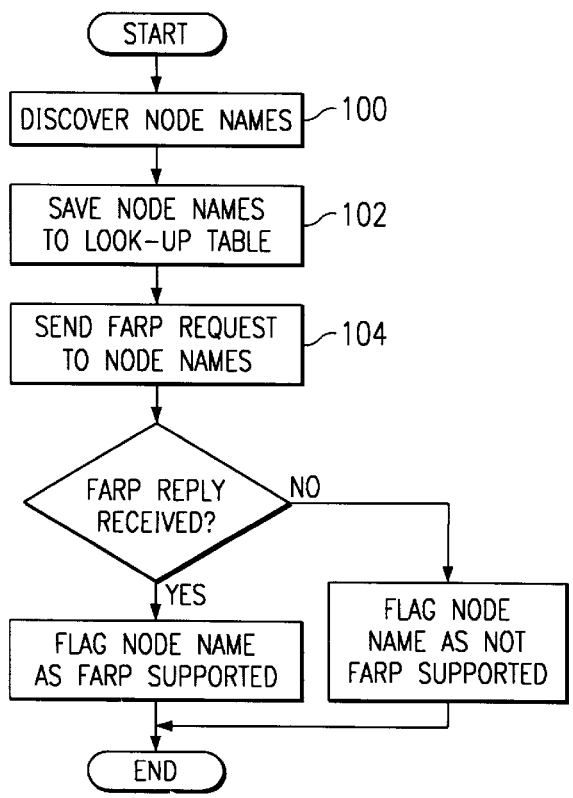
FIG. 2 is a flow diagram illustrating one embodiment of the method of discovering storage devices on a storage area network that are not FARP compatible.

FIG. 2 shows a flow diagram according to the present invention for determining all of the storage devices that are not FARP compatible connected to each storage router and holding that information in a look-up table. For example, the diagram of FIG. 2 illustrates one method for determining that SCSI storage device 30 and storage device 20 of FIG. 1 are attached to storage router 18 in storage area network 10 and storing that information at storage router 18.

At step 100, the storage router 18 discovers, for each arbitrated loop physical address on its local arbitrated loop 16, the node name (or world wide name) for each storage device. For the network of FIG. 1, storage router 18 performs a discovery to determine the node name for storage device 20 and the node name for SCSI storage device 30. This discovery can be done by using a common discovery method, such as the private loop SCSI direct attach (FC_PLDA) profile discovery method. Any method for determining the node name for each storage device in the arbitrated loop will suffice.

At step 102, the storage router 18 will save the information to a look-up table 22 in the storage router memory. The look-up table 22 will save the node name for each valid AL_PA discovered on the arbitrated loop 16. The look-up table 22 allows the storage router 18 to access a node name for a storage device based on the storage device's AL_PA. Steps 102 and 104 are accomplished through the execution of the node name discovery software program 24.

At step 104, the storage router 18 broadcasts a FARP request to each of the node names contained in the look-up table 22. With reference to FIG. 1, this broadcast FARP request would go to storage device 20 and SCSI storage device 30. At step 106, the storage router 18 waits for the reply to the broadcast FARP request in step 104. If a storage device does not respond to the FARP request (i.e., if a FARP reply is not received for a particular node name), the node name entry in the look-up table for that non-responsive storage devise is flagged as not being FARP compatible, as shown in step 108. If a FARP reply is received for a particular node name, that node name entry in the look-up table is flagged as being FARP compatible, as shown in step 110. With reference to FIG. 1, storage router 18 would not receive a reply from SCSI storage device 30 and would flag the node name entry for SCSI storage device 30 in look-up table 22 as not FARP compatible (for example, using a "FARP_NOT_SUPPORTED" flag). In contrast, storage router 18 would receive a FARP reply from FARP compatible storage device 20 and would flag the node name entry for storage device 20 in look-up table 22 as FARP compatible (for example, using a "FARP_SUPPORTED" flag). Once each storage device node name on the look-up table is marked, the storage router 18 has a complete listing in the look-up table 22 of whether or not each storage device attached to the storage router 18 through arbitrated loop 16 is capable of supporting FARP. Steps 106 through 110 are accomplished using the FARP request software program 26.

Figure 3:
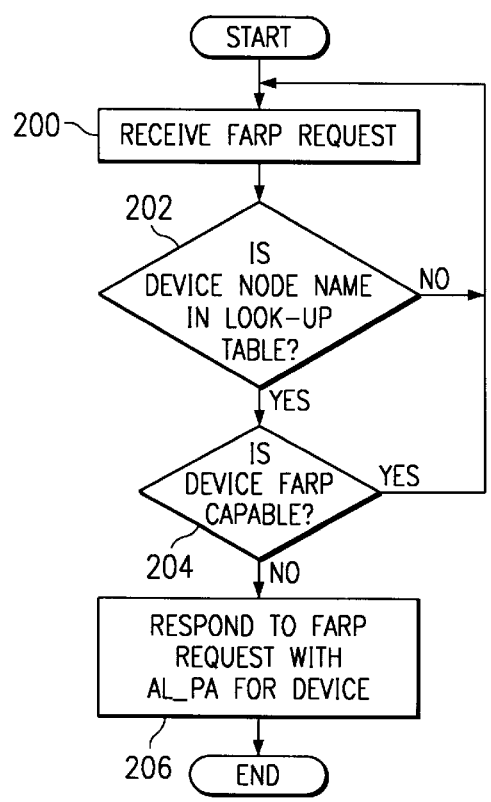
FIG. 3 is a flow diagram illustrating an embodiment of the present invention for replying to FARP discovery requests for storage devices on a storage area network that are not FARP compatible.

FIG. 3 shows a flow diagram of how the storage device 18 can act as a proxy for any storage devices that are not FARP compatible and reply to FARP request broadcasts for those devices. At step 200, a FARP broadcast containing the node name of the storage device to which the FARP broadcast is directed is sent out over the network. The FARP broadcast could be any FARP message requesting a reply from a storage device and can be generated from any number of sources. At step 202, the storage router 18 will attempt to match the node name contained in the FARP request with a node name in the look-up table 22 on the storage router 18. If the node name is not contained in the storage router's look-up table 22, the storage router takes no further action. If the node name is contained in the storage router's look-up table, the storage router determines whether the storage device is FARP capable by accessing the look-up table to discover whether the node name is flagged as FARP capable at step 204. If the node name is flagged as FARP compatible, the storage router takes no further action. If the node name is flagged as not supporting FARP, the storage router 18 will respond to the originator with a FARP reply containing the AL_PA for the storage device, as shown at step 206. In this way, a device can use a FARP request to discover the address of a storage device that is not FARP compatible. Steps 200 through 206 can be accomplished using the proxy FARP software program 28.

To further illustrate how the present invention can use a storage router as a proxy for a legacy storage device, with reference to FIGS. 1 and 2, the host 14 could send two FARP broadcast requests, the first containing the node name for FARP compatible storage device 20, and the second containing the node name for SCSI storage device 30. The first FARP broadcast would be requesting communication with storage device 20, while the second would be requesting communication with storage device 30. Storage router 18 would receive the FARP broadcasts at step 200. At step 202, storage router 18 would compare the node name in the FARP broadcasts and discover the node names for both storage device 20 and SCSI storage device 30 on look-up table 22. For the FARP request containing the node name for storage device 20, storage router 18 would determine from the look-up table 22 that the node name for storage device 20 was flagged as FARP compatible and would take no further action (because storage device 20 would respond to the FARP broadcast with its AL_PA). For the FARP broadcast containing the node name for SCSI storage device 30, storage router 18 would determine from look-up table 22 that SCSI storage device 30 was not FARP compatible. Storage router 18 would then respond to host 14 with a FARP reply containing the AL_PA of SCSI storage device 30. In this way, the storage router 18 acts as a proxy for the SCSI storage device 30.

The present invention can also be used in conjunction with another discovery technique to discover storage devices locally attached to the storage router's SCSI interface, such as tape drive 72. Thus providing the capability to discover any legacy SCSI device on the storage area network, whether the storage device is locally attached to the router at a SCSI interface or is on an arbitrated loop and attached to the router through an FC interface.

Figure 4:
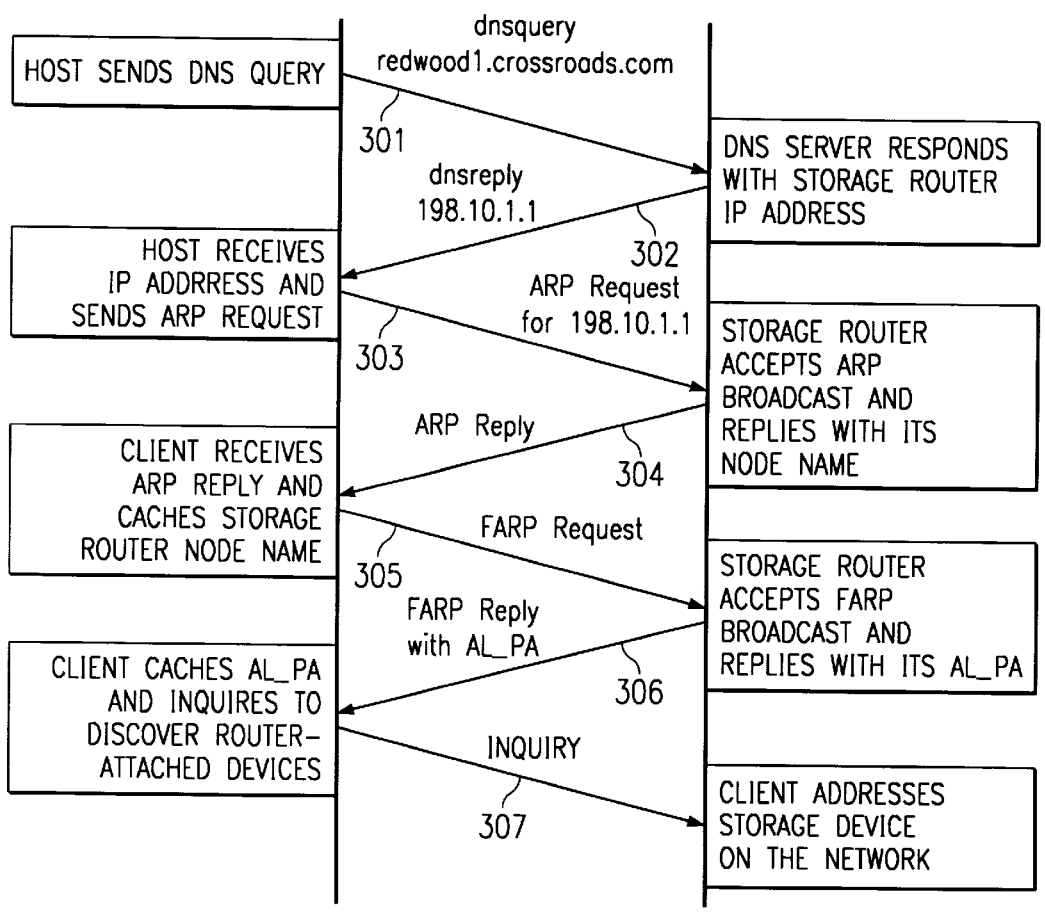
FIG. 4 is a flow diagram illustrating a method of discovering the physical address of a legacy SCSI device attached via a SCSI bus to a storage router.

With reference to FIGS. 1 and 4, a description of how the host computer 14 can discover a legacy SCSI storage device that is locally attached to a storage router through a SCSI interface is provided. At step 301, a dns query software program 32 resident on the host computer 14 sends a query to the dns server 50 requesting a response as to what storage router has a particular fully qualified domain name. For example, if storage router 18 has the fully qualified domain name, "redwood1.crossroads.com", then the dns request for fully qualified domain name "redwood1.crossroads.com" will be a request for the IP address of storage router 18. The fully qualified domain name is a static address, while the AL_PA is a dynamic name. While client application 14 knows the fully qualified domain name of the storage router in the storage area network, the current AL_PA for that storage router will not necessarily be known. The dns query would be in traditional Internet protocol that would be sent out over the fibre channel host bus adapter. The fibre channel host bus adapter at the dns server 50 can receive and process both IP and SCSI messages.

The dns server 50 has a look-up table 52 of resource records that correlates fully qualified domain names to IP addresses for storage routers on the arbitrated loop 16. At step 302, the dns server 50 receives the dns query packet and replies to the host computer 14 with the IP address for storage router 18 using a dns reply software program 54 resident in memory on the dns server 50. At step 303, the host computer 14 receives the storage router's IP address and sends a broadcast address resolution protocol (ARP) request over the storage area network 10 that includes the IP address for storage router 18. The ARP request is sent by an ARP request software program 36 resident on or accessible by the host computer 14. This ARP request is a request to find the node name that contains the storage router IP address sent in the request. Each fibre channel device has an organizationally unique node name which is currently defined to begin with an OUI (or organizationally unique identifier) and has an eight byte total length. It should be understood that the present invention can still accomplish its intended results based on any structure of unique FC World Wide Node Name.

At step 304, storage router 18 receives the ARP request with the IP address for storage router 18 sends an ARP reply containing its node name. Thus, any storage router can respond with its node name if it receives a request containing its IP address (i.e., only the particular storage router having the IP address in the ARP request will respond to the ARP request). The ARP reply can be sent using an ARP reply software program 38 resident on each storage router. The host computer 14 receives the ARP reply including the node name of storage router 18 and can cache the node name. The host computer 14 has now gone from the fully qualified domain name of the router to the router's FC node name.

At step 305, the host computer 14 sends a broadcast fibre channel address resolution protocol (FARP) request that includes the node name for storage router 18 to the storage area network 10 to request the AL_PA (or Port_ID) of storage router 18. This FARP request can be sent using a node name FARP request software program 40 resident on or accessible by the host computer 14. In this manner, the AL_PA for storage router 18 is discovered. At step 306, storage router 18 sends a node name FARP reply using a node name FARP reply software program 42, the FARP reply including the storage router's 18 AL_PA (or Port ID) to the host 14. The host 14 has now discovered the AL_PA for storage router 18 from the router's fully qualified domain name.

In step 307, the host computer 14 can perform a number of known discovery methods (as defined in various SCSI specifications) to determine the physical locations of storage device 72 directly attached to the storage router 18. For example, the host computer 14 can sent inquiries to every AL_PA or inquiries to every logical unit or a REPORT LUNS to discover storage device 72 attached to storage router 18 and determine whether the application is compatible with storage device 72.

Assuming storage device 72 is compatible with the client application 14, the communication between the storage device and the client application at the host computer can occur using FCP, rather than IP or some other protocol. If none of the storage devices locally attached to the storage router 18 are compatible, the host computer 14 could execute steps 1–7 again any other storage routers on the storage area network 10.

It should be understood that the dns query software program 32, the ARP request software program 36, and the node name FARP request software program 40 can all comprise a single host software package accessible by the host computer and executed through the host computer 14 processor. Furthermore, each of these host software programs could be included in the client application 34 resident on the host computer 14. It should be further understood that the ARP reply software program 38 and the node name FARP reply software program 40 can comprise a single software package resident on the memory of the storage router 18 and executed by a processor in the storage router.

Although the present invention has been described in detail, it should be understood that various changes, substitutions and alterations can be made hereto without departing from the spirit and scope of the invention as described by the appended claims.

What is claimed is:

1. A method for responding to a Fibre Channel Address Resolution (FARP) broadcast over a fibre channel network intended for a storage device that is not FARP compatible, comprising:

receiving the FARP broadcast at a storage router that is connected to the storage device;

determining at the storage router if the storage device is FARP compatible; and if the storage device is not FARP compatible, sending a reply to the FARP broadcast from the storage router that contains the physical address of the storage device.

2. The method of claim 1, wherein the storage device is connected to the storage router via an arbitrated loop.

3. The method of claim 1, wherein the FARP broadcast is sent by a host computer from a client application resident on the host computer.

4. The method of claim 3, wherein the FARP broadcast is sent through a fibre channel switch to an arbitrated loop on which the storage router and the storage device reside.

5. The method of claim 1, further comprising:
performing a discovery by the storage router to determine a node name for each storage device connected to the storage router;
saving discovered node names to a look-up table on the storage router;
sending a FARP request from the storage router to each storage device determined to have a node name on the look-up table; and
within the look-up table, flagging the corresponding node name for each storage device that replies to the storage router FARP request as FARP compatible and flagging the corresponding node name for each storage device that does not respond to the storage router FARP request as not being FARP compatible.

6. The method of claim 5, wherein each step of claim 5 is performed prior to receiving the FARP broadcast.

7. The method of claim 6, wherein the storage router and the storage device reside on and are connected via an arbitrated loop.

8. The method of claim 7, wherein the arbitrated loop contains a plurality of SCSI storage devices.

9. The method of claim 5, wherein the step of determining at the storage router if the storage device is FARP compatible is accomplished by accessing the look-up table to compare the node name of the storage device in the FARP broadcast with the node name flag information in the look-up table.

10. A method for using a storage router as a proxy for a storage device that is not Fibre Channel Address Resolution Protocol (FARP) compatible over a fibre channel network, comprising:
performing a discovery by the storage router to determine a node name for each storage device connected to the storage router;
saving discovered storage device node names to a look-up table on the storage router;
sending a FARP request from the storage router to each storage device determined to have a node name on the look-up table;
within the look-up table, flagging the corresponding node name for each storage device that replies to the storage router FARP request as FARP compatible, and flagging the corresponding node name for each storage device that does not respond to the storage router FARP request as not being FARP compatible;
receiving a FARP broadcast at the storage router, wherein the FARP broadcast is directed to at least one of each storage device connected to the storage device;
determining at the storage router if the storage device is FARP compatible by accessing the look-up table; and
if the storage device is not FARP compatible, sending a reply to the FARP broadcast from the storage router that contains a physical address (AL_PA) of the storage device.

11. The method of claim 10, wherein the storage device is connected to the storage router via an arbitrated loop and the FARP broadcast is sent by a client application resident on a host computer.

12. The method of claim 11, wherein the storage device is connected to the storage router via a local SCSI interface, and wherein the discovery by the storage router further comprises:
sending an Internet protocol domain name query containing a fully qualified domain name from a second application resident on the host computer over a storage area network to a domain name server to determine an Internet Protocol address for the storage router;
locating at the domain name server the Internet Protocol address for the storage router based on the fully qualified domain name;
sending an Internet protocol reply containing storage router Internet Protocol address from the domain name server to the application;
sending an address resolution protocol request containing the Internet protocol address from the application over the storage area network to determine a node name for the storage router;
sending an address resolution protocol reply containing the storage router node name to the application;
sending a fibre channel address resolution protocol request containing the device node name from the application to the storage router to determine an arbitrated loop physical address of the storage router;
sending a fibre channel address resolution protocol reply containing the storage router arbitrated loop physical address to the application; and
sending a storage device discovery command from the application to the storage router to discover a storage device attached to the storage router.

13. A system for using a storage router as a proxy for a storage device that is not Fibre Channel Address Resolution (FARP) compatible over a fibre channel network, comprising:
a processor;
a memory;
a node name discovery software program resident on the memory, the node name discovery program operable to direct the processor to:
perform a discovery to determine a node name for each storage device connected to the storage router;
save discovered node names to a look-up table on the storage router;
a FARP request software program resident on the memory, the FARP request software program operable to direct the processor to:
send a FARP request to each storage device determined to have a node name on the look-up table;
flag in the look-up table the corresponding node name for each storage device that replies to the storage router FARP request as FARP compatible; and
flag in the look-up table the corresponding node name for each storage device that does not respond to the storage router FARP request as not being FARP compatible; and
a proxy FARP software program resident on the memory, the proxy FARP software program operable to direct the processor to:
receive a FARP broadcast directed to a storage device connected to the storage router;
determine if the storage device is FARP compatible by accessing the look-up table; and
if the storage device is not FARP compatible, send a reply to the FARP broadcast from the storage router that contains the physical address of the storage device.

14. The system claim 13, wherein the storage device is connected to the storage router via an arbitrated loop.

15. The system claim 13, further comprising a fibre channel switch through which the FARP broadcast is sent to an arbitrated loop on which the storage router and the storage device reside.

16. The system of claim 15, wherein the arbitrated loop contains a plurality of SCSI storage devices.

17. The system of claim 13, wherein the storage device is connected to the storage router via a local SCSI interface, and wherein the system further comprises:
- a host computer capable of supporting Internet protocol and fibre channel protocol, comprising:
  - a host processor;
  - a host memory;
  - a domain name system (dns) query software program resident on the host memory;
  - an address resolution protocol (ARP) request software program residing on the host memory;
  - a node name FARP request software program residing on the host memory; and
  - a storage device discovery software program resident on the host memory;
- a domain name server capable of supporting Internet protocol and fibre channel protocol, comprising:
  - a domain name server processor;
  - a domain name server memory;
  - a resource record look-up table containing Internet protocol address and fully qualified domain name of the storage router, such resource record look-up table configured in a way that the Internet protocol address can be discovered from the fully qualified domain name; and
  - a dns reply software program resident on the domain name server memory; and
- a storage router, comprising:
  - a fibre channel interface that is addressable by the Internet Protocol address to allow support of both fibre channel protocol and address resolution protocol;
  - a storage router processor;
  - a storage router memory an ARP reply software program resident on the storage router memory; and
  - a node name FARP reply software program resident on the storage router memory, and wherein:
    - the dns query software program is operable to direct the host processor to send a domain name query containing the fully qualified domain name of the storage router over the storage area network to the domain name server;
    - the dns reply software program is operable to direct the domain name server to, in response to the dns query, access the resource record look-up table and discover the Internet Protocol address for the storage router based on the fully qualified domain name in the domain name query and to send a dns reply to the host computer that contains the storage router Internet Protocol address;
    - the ARP request software program operable to direct the host processor to, in response to the dns reply, send an address resolution protocol request containing the storage router Internet protocol address over the storage area network to determine a node name for the storage router;
    - the ARP reply software program operable to direct the storage router processor to, in response to the address resolution protocol request, send an address resolution protocol reply containing the storage router node name to the host computer;
    - the node name FARP request software program operable to direct the host processor to send a fibre channel address resolution protocol request containing the storage router node name to the storage router to determine a physical address of the storage router;
    - the node name FARP reply software program operable to direct the storage router processor to send a fibre channel address resolution protocol reply containing the storage router physical address to the client application; and
    - the storage device inquiry software program sends a storage device inquiry to the storage router to discover the storage device attached to the storage router.

18. The system of claim 17, further comprising:
- a data file containing a list of fully qualified domain names for each storage router in the storage area network; and
- a client application resident on the host memory, the client application operable to direct the host processor to access the data file, obtain the fully qualified domain name of the storage router, and send the domain name query to the domain name server.

* * * * *